United States Patent Office 3,532,565
Patented Oct. 6, 1970

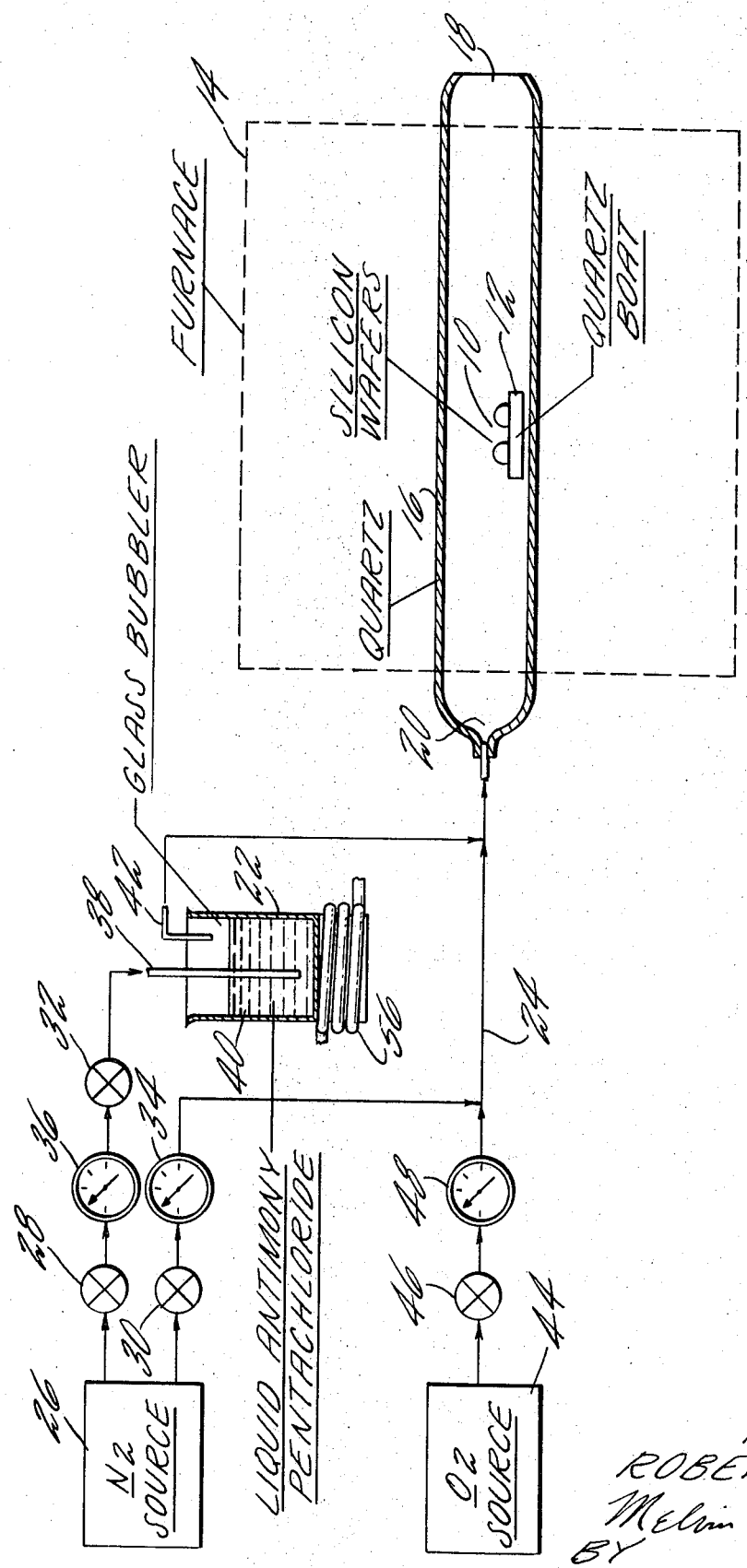

3,532,565
ANTIMONY PENTACHLORIDE DIFFUSION
Robert C. Cook, Worcester Township, Pa., assignor to United Aircraft Corporation, East Hartford, Conn., a corporation of Delaware
Filed Dec. 7, 1967, Ser. No. 688,734
Int. Cl. H01l 7/36, 7/44
U.S. Cl. 148—189       7 Claims

ABSTRACT OF THE DISCLOSURE

N-type impurity is diffused into silicon wafers in the production of a semiconductor by utilizing the vapor from a source of liquid antimony pentachloride which is carried by an inert carrier flow of nitrogen, the diffusion furnace also being fed oxygen in a gaseous flow with nitrogen.

BACKGROUND OF THE INVENTION

Field of invention

This invention relates to the production of semiconductors, and more particularly to the diffusion of N-type impurity in a silicon wafer by means of a source of liquid antimony pentachloride.

Description of the prior art

In the prior art, the doping of silicon wafers with impurities in order to form semiconductors is well known. It is also known that antimony may be used in various forms as a suitable source for providing an N-type impurity concentration in a semiconductor. Heretofore, forms of antimony utilized have usually been solid, such as antimony tetroxide. Some attempts to use various forms of liquid antimony have resulted in doped wafers having surface striations or other surface problems which rendered the use thereof unsuitable in the formation of semiconductors.

SUMMARY OF INVENTION

According to the present invention, liquid antimony pentachloride is bubbled into an inert gaseous flow which carries vaporous antimony pentachloride into the diffusion tube of a furnace; oxygen is provided by being carried in a gaseous state in an inert gaseous flow into the tube of the furnace.

Other objects, features and advantages of the present invention will become more apparent in the light of the following detailed description of preferred embodiments thereof, as illustrated in the accompanying drawing.

BRIEF DESCRIPTION OF THE DRAWING

The sole figure herein comprises a semipictorial block illustration of an antimony pentachloride diffusion system in accordance with the present invention.

DESCRIPTION OF THE PREFERRED EMBODIMENT

Referring briefly to the figure herein, silicon wafers 10 which are carried in a wafer boat 12 may be placed in the hot zone of a diffusion furnace 14 which includes a quartz tube 16 in accordance with known teachings of the prior art. One end 18 of the quartz tube 16 is open to the atmosphere, and the other end 20 of the quartz tube 16 is fitted to suitable piping to connect the tube with a source bubbler 22 and with an oxygen inflow tube 24. A nitrogen source 26 is connected to two flow control valves 28, 30 and thence through respective flow meters 32, 34. The flow meter 32 may be fed by a pressure regulator 36, the output of which is connected to the inlet tube 38 of the source bubbler 22. A supply of liquid antimony pentachloride ($SbCl_5$) 40 is maintained in the bottom of the bubbler 22 so that nitrogen flowing through the inlet tube 38 will bubble up through the antimony pentachloride 40, thus aiding in the vaporization of the antimony pentachloride in the flow of nitrogen in an outlet tube 42 of the bubbler 22.

A source of oxygen 44 is connected to a flow valve 46 which in turn is connected to a flow meter 48. The output of the flow meter 48 joins the output of the flow meter 34 in the oxygen inlet tube 24.

In an exemplary process according to the present invention, the furnace 14 is so adjusted as to maintain a suitable temperature within the central zone of the tube 16, such as 1200 degrees centigrade; however, various temperatures can be used in dependence upon the concentration of antimony which it is desired to achieve in the process of the present invention. As is well known in the art, the concentration of dopant in a silicon wafer is a function of the solid solubility of the dopant material in the substrate material (silicon herein), which in turn is a function of the temperature at which the dopant is deposited upon the surface of the wafer. If a higher temperature is used, a greater concentration of dopant (which results from higher solubility) will be achieved; by using a lower temperature, the solubility of the dopant in the silicon is less, so a lower concentration is achieved. Provided the time and supply of source are sufficient, temperature alone will determine the degree of concentration of dopant in the silicon.

Once a proper temperature is established in the furnace 14, a suitable flow of a mixture of nitrogen and oxygen is provided through the tube 16. The valve 30, 46 is adjusted so as to supply a flow in the inlet tube 24 which includes 10 cubic centimeters per minute of oxygen and 2,000 cubic centimeters per minute of nitrogen. This flow is maintained through the tube 16 prior to placing the wafer boat 12 into the tube 16. Then the boat 12 containing wafers 10 may be placed within the central zone of the tube 16. Thereafter, it is preferable to allow the wafers a few minutes in the oven to reach oven temperature: for instance, a delay of about five minutes after the wafers are placed in the oven has been found to be suitable in most cases. Once the wafers are up to oven temperature, the valve 28, which causes a flow of nitrogen into the bubbler 22, may be turned on, and it may be set to a rate of about 100 cubic centimeters per minute in this example being described. Since the bubbler 22 includes a heater 56 (as is well known in the art) the temperature of the liquid antimony pentachloride may be maintained sufficiently high so that it will vaporize and be carried by nitrogen passing through the bubbler 22. The temperature of the antimony pentachloride may be, in a given example, approximately 25 to 32 degrees C., in other words, normal room temperature is adequate. For higher concentrations, slightly higher temperatures may be used via the heater. The flow of nitrogen through the source may be continued for a suitable time so as to achieve a guaranteed uniform concentration of dopant at the surface of the silicon, which also will result in driving the dopant into the silicon wafer some amount depending upon the length of time for which the deposition is allowed to proceed. In the given example, the flow of source through the bubbler into the tube 16 may be maintained for approximately 40 minutes. As is known in the art, the time can be adjusted so as to suit the concentration gradient which is desired. After the time for source flow has elapsed, the source may be turned off by closing the valve 28, and the wafers may be left in the oven for a suitable period of time. The reactions are believed to be:

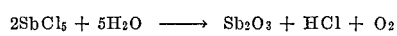
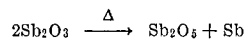

The wafers may be left in the oven after the source is turned off for approximately five minutes in accordance with the particular example of the present invention. This time is not critical and serves only to allow purging of any remaining source out of the tube so that the wafers may be moved to the open end of the tube to cool before being removed, without any source flowing. This avoids possible condensation of source on the surface of the wafers, thus decreasing surface damage and improving reproductibility and yields.

Other examples of flows, times and temperatures are given in tabular form below:

|  | Previous PNP Base Example | Extreme | Example N+ Pockets | Extreme |
|---|---|---|---|---|
| Time | 5/40/5 | Max. 2 hours | 5/25/5 | 10 min. (Min.). |
| Temp | 1,200° C | Min. 1,100° C | 1,280° C | 1,300° C. (Max.). |
| Source | 100 | Max. 500 cc./min | 85 cc./min | 25 cc./min. (Min.). |
| $N_2$ | 2,000 | Max. 4,000 cc./min | 95 cc./min | 50 cc./min. (Max.). |
| $O_2$ | 10 cc./min | Min. 5 cc./min | 15 cc./min | 100 cc./min. (Max.). |

It should be understood that the particular time, temperature and flow rates may all be adjusted in accordance with the particular device being produced. These rates are not a function of the present invention so much as of the detailed characteristics of devices being produced through the utilization of the invention. The adjustments made to time, temperature and flow of gases are in accordance with principles known in the art, and therefore are not restrictive upon the present invention.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. In the method of producing a semiconductor device, the steps of:
   preparing a source of antimony pentachloride elevated to a temperature at which it will readily vaporize;
   providing a vented area heated to a temperature which corresponds with the desired surface concentration for the semiconductor being produced;
   providing an inert gaseous flow through said source and into said heated area;
   providing a flow of oxygen into said heated area, whereby gaseous oxygen and vapors of said source may react so as to form antimony trioxide;
   and placing silicon wafers upon which semiconductor devices are to be produced into said heated area with said mixture of vaporous source and gaseous oxygen for a sufficient time to produce the desired impurity gradient for the device being produced.

2. The method according to claim 1 wherein said inert gaseous flow is nitrogen.

3. The method according to claim 1 wherein said gaseous oxygen is introduced into said heated area in combination with a gaseous inert carrier.

4. The method according to claim 3 wherein said inert carrier comprises nitrogen.

5. The method according to claim 4 wherein the flow of nitrogen source carrier is maintained at a rate of between 25 cc. per minute and 5000 cc. per minute in combination with a flow of oxygen of between 5 cc. per minute and 100 cc. per minute and an inert gas flow of between 50 cc. per minute and 4000 cc. per minute.

6. The method according to claim 5 wherein said heated area is maintained at a temperature between 1100 degrees C. and 1300 degrees C.

7. The method according to claim 1 wherein the time for which said wafers are subjected to the flow of source vapors and oxygen within said heated area is between ten minutes and two hours.

References Cited
UNITED STATES PATENTS

| 2,802,760 | 8/1957 | Derick et al. | 148—189 |
| 3,001,896 | 9/1961 | Marinace | 148—189 |
| 3,331,716 | 7/1967 | Bloem et al. | 148—187 |
| 3,442,725 | 5/1969 | Huffman et al. | 148—186 |

L. DEWAYNE RUTLEDGE, Primary Examiner

R. A. LESTER, Assistant Examiner

U.S. Cl. X.R.

148—188, 190